US012069160B2

(12) United States Patent
Roehrig et al.

(10) Patent No.: US 12,069,160 B2
(45) Date of Patent: Aug. 20, 2024

(54) ELECTRONIC CONTROL UNIT, APPARATUS FOR PERFORMING CONTROL OPERATIONS ON AN ELECTRONIC CONTROL UNIT, AND CORRESPONDING METHODS AND COMPUTER PROGRAMS

(71) Applicant: Bayerische Motoren Werke Aktiengesellschaft, Munich (DE)

(72) Inventors: Christian Roehrig, Munich (DE); Philipp Koppermann, Markt-Indersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 17 days.

(21) Appl. No.: 17/799,564

(22) PCT Filed: Oct. 22, 2020

(86) PCT No.: PCT/EP2020/079684
§ 371 (c)(1),
(2) Date: Aug. 12, 2022

(87) PCT Pub. No.: WO2021/164903
PCT Pub. Date: Aug. 26, 2021

(65) Prior Publication Data
US 2023/0076726 A1     Mar. 9, 2023

(30) Foreign Application Priority Data

Feb. 17, 2020  (EP) ...................................... 20157654

(51) Int. Cl.
*H04L 9/08*     (2006.01)
*H04L 9/30*     (2006.01)
(52) U.S. Cl.
CPC ............ *H04L 9/0819* (2013.01); *H04L 9/088* (2013.01); *H04L 9/30* (2013.01)

(58) Field of Classification Search
CPC ........ H04L 9/0819; H04L 9/088; H04L 9/30; H04L 9/0841; H04L 2209/84; H04L 63/083; G06F 21/44
See application file for complete search history.

(56) References Cited

U.S. PATENT DOCUMENTS

2008/0098224 A1* 4/2008  Hui ....................... H04L 9/3271
                                                                713/170
2017/0305368 A1* 10/2017 Markham ........... B60R 16/0231
(Continued)

FOREIGN PATENT DOCUMENTS

EP            3240260 A1    11/2017

OTHER PUBLICATIONS

International Search Report corresponding to International Patent Application No. PCT/EP2020/079684, dated Nov. 13, 2020 (3 Pages).

(Continued)

*Primary Examiner* — Han Yang
(74) *Attorney, Agent, or Firm* — Maginot, Moore & Beck LLP

(57) ABSTRACT

An electronic control unit for a vehicle includes processing circuitry configured to determine first cryptographic information based on a private key of the electronic control unit and based on a public key of a second entity. The processing circuitry is further configured to obtain second cryptographic information via an interface, and to compare the first cryptographic information and the second cryptographic information. The processing circuitry is also configured to unlock a control access to the electronic control unit if the second cryptographic in formation is based on a private key of the second entity and based on a public key of the electronic control unit.

19 Claims, 3 Drawing Sheets

(56) References Cited

U.S. PATENT DOCUMENTS

2019/0306136 A1* 10/2019 David .................. H04L 9/3242
2020/0100108 A1*  3/2020 Everson ............... H04L 9/3247

OTHER PUBLICATIONS

Written Opinion corresponding to International Patent Application No. PCT/EP2020/079684, dated Aug. 26, 2021 (12 Pages).
Extended European Search Report corresponding to European Patent Application No. 20157654.3, dated Jul. 23, 2020. (2 Pages).
European Office Action corresponding to European Patent Application No. 20157654.3, dated Aug. 7, 2020 (9 Pages).

* cited by examiner

ELECTRONIC CONTROL UNIT, APPARATUS FOR PERFORMING CONTROL OPERATIONS ON AN ELECTRONIC CONTROL UNIT, AND CORRESPONDING METHODS AND COMPUTER PROGRAMS

The present application is the U.S. national phase of PCT Application PCT/EP2020/079684 filed on Oct. 22, 2020, which claims priority of European patent application No. 20157654.3 filed on Feb. 17, 2020, which is incorporated herein by reference in its entirety

FIELD

The present disclosure relates to an electronic control unit, a method and a computer program for an electronic control unit, and to an apparatus, method and computer program for performing control operations on an electronic control unit.

BACKGROUND

Hardware debug interfaces, such as the debug interface defined by the JTAG (Joint Test Action Group), are a powerful tool for debugging embedded systems due to extensive read and write rights. However, such interfaces may represent a target for attackers with physical access to read-out security assets (e.g. secret keys) or overwrite critical data (e.g. tuning values such as a maximally allowed speed). To protect those interfaces, chip manufactures have introduced debug locking mechanisms that can only be unlocked by providing the correct password. Those secret keys are typically generated when the embedded system is programmed, in a next step, the generated keys are often stored by the supplier in its own database, or the database is transmitted to the OEM (Original Equipment Manufacturer). For that reason, the suppliers of the OEM might have access to the secret keys, which may be disadvantageous for several reasons. For once, it might neither be transparent who has access to the keys, nor might it be clear how the keys are protected against internal as well as external adversaries. For example, an employee of the supplier might decide to sell the keys, or the keys may be stored in an insecure server environment that can be easily penetrated. Additionally, the password might need to be stored for the next decades. For example, if the supplier has a financial crisis, it may be required to shut down the servers that store the respective keys. Moreover, storing those keys requires dedicated memory as well as the mandatory security mechanisms for protecting this storage, which is typically implemented by some kind of backend system.

SUMMARY

One or more of the above-mentioned limitations are addressed by the subject-matter disclosed herein.

Embodiments of the present disclosure are based on the finding that it may be desirable that the password used to access the debugging functionality of the electronic control unit never actually leaves the electronic control unit, but can be recreated by the OEM. To this end, a shared secret may be generated by two entities—by the electronic control unit, and by an entity of the OEM. To this end, the known Diffie-Heliman key exchange can be modified to provide a temporally decoupled key exchange between the entities. The electronic control unit is configured to determine the shared secret that is shared between the entities using a private key of the electronic control unit and using a public key of the OEM. The OEM can do the same using the public key of the electronic control unit (which may be provided by the electronic control unit, or printed on the electronic control unit), and based on the private key of the OEM. Thus, the private key of the electronic control unit, which would allow reconstruction of the shared secret by the supplier, could be contained in the electronic control unit itself, unknown to the supplier, reducing the risk of a breach of keys to the electronic control unit. Additionally, as the shared secret is identical between the two entities, a simple comparison of the shared secrets may suffice, alleviating the need for a processor to be active to perform the comparison. Instead, this functionality can be moved into the debug port of the electronic control unit, enabling a use of the concept even if a main processor of the electronic control unit is inactive due to an internal error state. Thus, a lightweight mechanism is provided that enables an OEM to ensure that the supplier is incapable of storing the secret keys and to avoid the necessity to run a full-blown backend secret key storage, while getting control even in non-functional states of the electronic control unit.

Embodiments of the present disclosure thus provide an electronic control unit for a vehicle. The electronic control unit comprises processing circuitry configured to determine first cryptographic information based on a private key of the electronic control unit and based on a public key of a second entity. The processing circuitry is configured to obtain second cryptographic information via an interface. The processing circuitry is configured to compare the first cryptographic information and the second cryptographic information. The processing circuitry is configured to unlock a control access to the electronic control unit if the second cryptographic information is based on a private key of the second entity and based on a public key of the electronic control unit. As the private key of the electronic control unit is not required by the second entity to determine the second cryptographic information, the private key of the electronic control unit might be contained within the electronic control unit, and may even be discarded after generation of the first cryptographic information. Furthermore, the private key may be generated during initialization of the electronic control unit at the OEM, further shielding the private key from access by a malicious actor.

For example, the processing circuitry may be configured to store the first cryptographic information using memory circuitry of the electronic control unit. The processing circuitry may be configured to discard the private key of the electronic control unit after determining the first cryptographic information. Consequently, the private key of the electronic control unit might not be disclosed to anyone.

For example, the processing circuitry is configured to determine the first cryptographic information during a factory setup process of the electronic control unit, e.g. during initialization of the electronic control unit at the OEM. Thus, the first cryptographic information may be generated on device, and never be exposed.

In various embodiments, the processing circuitry may be configured to generate the private key of the electronic control unit. Consequently, the private key of the electronic control unit might be contained within the electronic control unit, and not be exposed.

Furthermore, the processing circuitry may be configured to generate the public key of the electronic control unit based on the private key of the electronic control unit. The processing circuitry may be configured to provide the public key of the electronic control unit via the interface. If the public key is generated on-device, the private key may be contained within the electronic control unit. For example, the public key may be provided via the interface during a factory setup process of the electronic control unit, e.g. during initialization of the electronic control unit at the OEM.

In some embodiments, the public key is shown in machine-readable form on the electronic control unit. Thus, the public key need not be saved in a database, but can be read by a debugging device using an optical scanner.

In various embodiments, the processing circuitry is configured to obtain the second cryptographic information from an external apparatus via the interface, and to provide debug functionality for the electronic control unit to the external apparatus (via the interface) after unlocking the control access. In other words, the second cryptographic information may be used to unlock debug access to the electronic control unit.

Embodiments of the present disclosure further provide an apparatus for performing control operations on an electronic control unit of a vehicle. The apparatus comprises processing circuitry that is configured to provide cryptographic information to the electronic control unit via an interface. The cryptographic information is based on a public key of the electronic control unit and based on a private key of a second entity. The processing circuitry is configured to gain control access to the electronic control unit via the interface. The control access to the electronic control unit is unlocked by the electronic control unit based on the provided cryptographic information. This apparatus may be the counterpart to the electronic control unit, gaining control access to the electronic control unit based on the above-mentioned cryptographic key exchange scheme.

For example, the processing circuitry may be configured to determine the cryptographic information based on the public key of the electronic control unit and based on the private key of the second entity. Thus, the cryptographic information can be determined on-site after obtaining the public key of the electronic control unit. Alternatively, the processing circuitry may be supplied with the cryptographic information by a backend entity. In this case, the apparatus need not know the private key of the second entity.

In various embodiments, the processing circuitry is configured to communicate with the electronic control unit via the interface using a wired or wireless data communication connection. The processing circuitry may be configured to receive the public key of the electronic control unit via the data communication connection. Thus, the public key may be received from the electronic control unit, the cryptographic information subsequently generated and provided. Alternatively, the processing circuitry may be configured to process visual sensor data depicting at least a part of the electronic control unit to obtain the public key of the electronic control unit. Accordingly, the public key may be printed on the exterior of the electronic control unit.

In embodiments, the processing circuitry may be configured to access a debugging functionality of the electronic control unit after gaining the control access to the electronic control unit. Thus, the apparatus may be a debugging apparatus.

Embodiments of the present disclosure further provide a method for an electronic control unit of a vehicle. The method comprises determining first cryptographic information based on a private key of the electronic control unit and based on a public key of a second entity. The method comprises obtaining second cryptographic information via an interface. The method comprises comparing the first cryptographic information and the second cryptographic information. The method comprises unlocking a control access to the electronic control unit if the second cryptographic information is based on a private key of the second entity and based on a public key of the electronic control unit.

Embodiments of the present disclosure further provide a method for performing control operations on an electronic control unit of a vehicle. The method comprises providing cryptographic information to the electronic control unit via an interface. The cryptographic information is based on a public key of the electronic control unit and based on a private key of a second entity. The method comprises gaining control access to the electronic control unit via the interface. The control access to the electronic control unit is unlocked by the electronic control unit based on the provided cryptographic information.

Embodiments of the present disclosure further provide a computer program having a program code for performing at least one of the above methods, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, an alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality.

Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
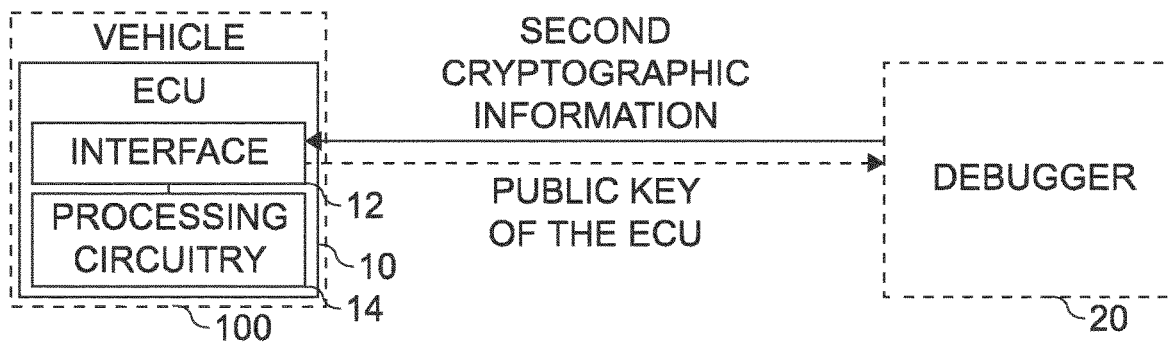
FIG. 1a shows a block diagram of an embodiment of an electronic control unit.

FIG. 1a shows a block diagram of an embodiment of an electronic control unit 10 for a vehicle 100. The electronic control unit 10 comprises processing circuitry 14 and an interface 12 (e.g. interface circuitry 12), which is coupled to the processing circuitry 14. In general, the processing circuitry 14 may be configured to provide the functionality of the electronic control unit 10. In some other embodiments, the processing circuitry 14 may (merely) provide the functionality of a debug interface of the electronic control unit 10, alongside a main processor of the electronic control unit 10. In other words, the processing circuitry 14 may be configured to implement a debugging interface of the electronic control unit 10.

The processing circuitry 14 is configured to determine first cryptographic information based on a private key of the electronic control unit 10 and based on a public key of a second entity. The processing circuitry 14 is configured to obtain second cryptographic information via the interface 12. The processing circuitry 14 is configured to compare the first cryptographic information and the second cryptographic information. The processing circuitry 14 is configured to unlock a control access to the electronic control unit 10 if the second cryptographic information is based on a private key of the second entity and based on a public key of the electronic control unit 10. FIG. 1a further shows a vehicle 100 comprising the electronic control unit 10.

Figure 1B:
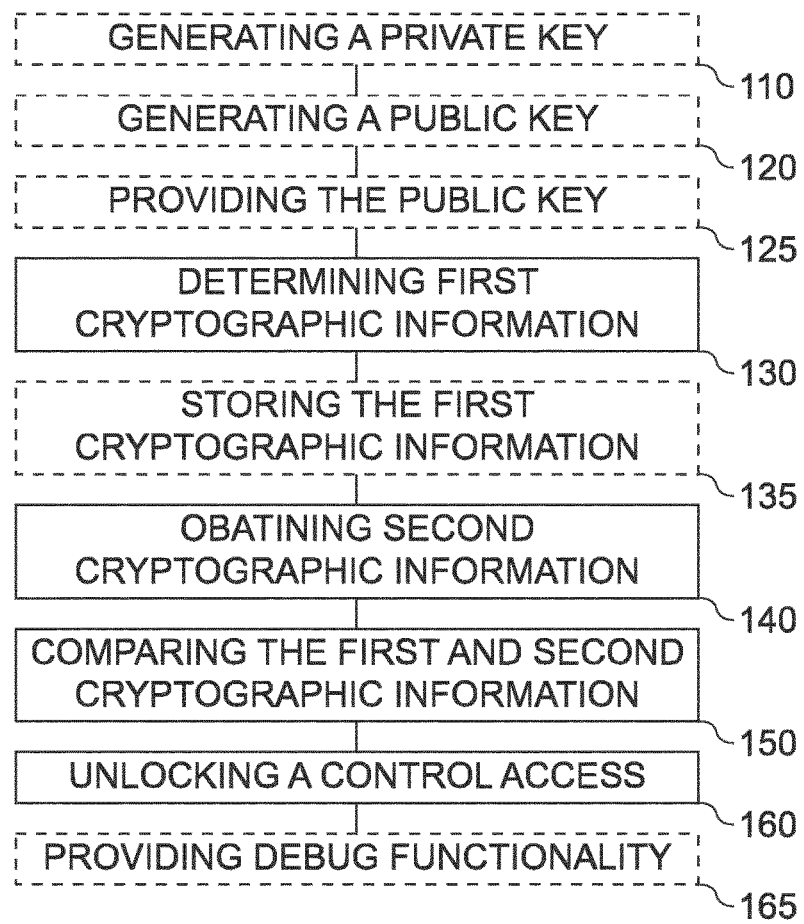
FIG. 1b shows a flow chart of an embodiment of a method for an electronic control unit.

FIG. 1b shows a flow chart of an embodiment of a corresponding method for the electronic control unit 10. Correspondingly, the method may implement the functionality of a debug interface of the electronic control unit 10. The method comprises determining 130 first cryptographic information based on a private key of the electronic control unit 10 and based on a public key of a second entity. The method comprises obtaining 140 second cryptographic information via an interface. The method comprises comparing 150 the first cryptographic information and the second cryptographic information. The method comprises unlocking 160 a control access to the electronic control unit if the second cryptographic information is based on a private key of the second entity and based on a public key of the electronic control unit.

The following description relates both to the electronic control unit 10 of FIG. 1a and to the method of FIG. 1b. Features described in connection with the electronic control unit 10 of FIG. 1a may likewise be applied to the method of FIG. 1b.

Various embodiments of the present disclosure relate to an electronic control unit, or to a method or computer program for an electronic control unit. For example, the electronic control unit may be an electronic control unit of a vehicle, or an electronic control unit of another piece of electronically controlled machinery. In general, vehicles comprise a multitude of different electronic control units, e.g. electronic control units for controlling the engine, electronic control units of sensors of the vehicle, electronic control units of a security system of the vehicle etc. These electronic control units are often manufactured by third-party suppliers of the manufacturer of the vehicle (i.e. of the Original Equipment Manufacturers, OEMs). At the same time, OEMs often wish to limit the access to said electronic control units, e.g. in order to avoid manipulations of the electronic control units by malicious actors. In some systems, as has been laid out afore, the electronic control units are secured using security codes that are implanted into the electronic control units by the suppliers, and shared with the OEMs via a database. In such cases, the database comprising the security codes may present a compelling target for malicious actors. Embodiments may avoid providing such a compelling target by using a cryptographic scheme, in which shared secrets are used that are generated using two pairs of private and public keys. As the name suggests, the public keys may be publicly accessible without compromising the security concept. Thus, merely the public keys may be exchanged between the OEM and the supplier, enabling access of the OEM to the electronic control units without comprising the security concept.

The processing circuitry 14 is configured to determine the first cryptographic information based on a private key of the electronic control unit 10 and based on a public key of a second entity. In the context of the present disclosure, (at least) six pieces of cryptographic information are used:

a private key and a public key of the electronic control unit (i.e. of a key pair of the electronic control unit 10 comprising the private and the corresponding public key)

a private key and a public key of the second entity (i.e. of a key pair of the second entity comprising the private and the corresponding public key)

a shared secret, as generated by the electronic control unit 10, and a shared secret, as generated by an apparatus of the second entity The shared secret generated by the electronic control unit 10 is denoted the first cryptographic information, and the shared secret generated by the apparatus of the second entity is denoted the second cryptographic information. If the first and second cryptographic information match, i.e. if the shared secrets match, the control access to the electronic control unit 10 may be unlocked. For example, the first and second cryptographic information match, i.e. the shared secret match, if the first cryptographic information is based on the private key of the electronic control unit and based on the public key of the second entity, and if the second cryptographic information is based on the private key of the second entity and based on the public key of the electronic control unit 10.

In general, the most secure approach may be to generate the private key of the electronic control unit on-device, e.g. using the processing circuitry 14. In other words, the processing circuitry 14 may be configured to generate the private key of the electronic control unit 10. For example, the processing circuitry 14 may be configured to use a cryptographic functionality of the processing circuitry 14 to generate the private key of the electronic control unit 10, or the processing circuitry 14 may be configured to execute a cryptographic algorithm to generate the private key of the electronic control unit 10. Alternatively, the processing circuitry 14 may be configured to obtain the private key of the electronic control unit 10, e.g. via the interface 12, and/or from another processor of the electronic control unit 10.

Based on the private key of the electronic control unit 10, the public key may be generated. In other words, the processing circuitry 14 may be configured to generate the public key of the electronic control unit 10 based on the private key of the electronic control unit 10. For example, the processing circuitry 14 may be configured to derive the public key of the electronic control unit 10 from the private key of the electronic control unit 10. In various implementations, e.g. when adapting the Elliptic Curve Diffie Hellman key exchange in a time-decoupled manner, the private key may be an integer, and the public key may be a point on an elliptic curve that is based on a multiple of the private key's integer.

The processing circuitry 14 may be configured to provide the public key of the electronic control unit 10 via the interface 12. For example, the public key may be provided via the interface 12 during a factory setup process of the electronic control unit 10, e.g. before control access to the electronic control unit 10 is locked. For example, the factory setup process may be a factory setup process at the manufacturer of the electronic control unit 10, or a factory setup process at a manufacturer of the vehicle (or machine), i.e. the OEM, comprising the electronic control unit 10. In this case, the public key may be provided to a factory setup entity, and subsequently stored in a database, transmitted to the OEM, or printed out on a label that is pasted on the electronic control unit. For example, the public key may be shown in machine-readable form on the electronic control unit 10, e.g. on a label, or on an electronic display of the electronic control unit 10. Alternatively, the public key of the electronic control unit 10 may be provided to the apparatus 20 seeking to gain control access to the electronic control unit 10, e.g. before obtaining the second cryptographic information. Again, in another embodiment, the public key may be generated outside the device, and later provided to the processing circuitry 14.

To generate the first cryptographic information, the public key of the second entity is used. For example, the processing circuitry 14 may be configured to obtain (i.e. receive) the public key of the second entity via the interface 12, e.g. from an apparatus 20 seeking to gain control access to the electronic control unit 10, or from a factory setup apparatus before the control access to the electronic control unit 10 is locked. In the former case, the public key of the second entity may be verified, e.g. to avoid public keys from entities that are not trustworthy. In various embodiments, however, the public key of the second entity may be stored within memory circuitry of the electronic control unit 10. For example, the public key of the second entity may be part of a firmware of the electronic control unit 10.

Once the private key of the electronic control unit 10 and the public key of the second entity are available, the processing circuitry 14 may use both to determine the first cryptographic information. As has been pointed out before, the first cryptographic information may be a shared secret of the key exchange performed between the electronic control unit 10 and the second entity. In other words, it may be a symmetric key, that can be generated using one of two different key combinations—using the private key of the electronic control unit 10 and the public key of the second entity, or using the private key of the second entity and the public key of the electronic control unit 10. For example, the processing circuitry 14 may be configured to determine the first cryptographic information during a factory setup process of the electronic control unit 10. Alternatively, the processing circuitry 14 may be configured to determine the first cryptographic information upon receipt of the public key of the second entity, or upon generation of the private key of the electronic control unit 10. After generating the first cryptographic information, it may be stored within a memory of the electronic control unit 10. In other words, the processing circuitry 14 may be configured to (permanently) store the first cryptographic information using memory circuitry of the electronic control unit 10 (i.e. within the electronic control unit 10).

Once the first cryptographic information is generated, the private key of the electronic control unit 10 might not be required anymore, and may be discarded. In other words, the processing circuitry 14 may be configured to discard (i.e. delete) the private key of the electronic control unit 10 after determining the first cryptographic information (and/or after storing the first cryptographic information).

After generating the first cryptographic information, or, alternatively, after the public key of the second entity is stored within the electronic control unit 10, the control access to the electronic control unit 10 may be locked. In other words, the processing circuitry 14 may be configured to lock the access to the electronic control unit 10, e.g. if one or more of the following conditions are met:

before receiving the second cryptographic information,
after the public key of the second entity is stored within the electronic control unit 10,
after the public key of the electronic control unit is provided via the interface 12, and/or
after the first cryptographic information is generated.

To unlock the electronic control unit 10, the first cryptographic information is compared to the second cryptographic information. The processing circuitry 14 may be configured to compare the first and second cryptographic to determine that (or whether) the second cryptographic information is generated using the private key of the second entity and the public key of the electronic control unit 10. In other words, if the second cryptographic information matches the first cryptographic information, the second cryptographic information may be deemed to be generated using the private key of the second entity and the public key of the electronic control unit 10. If this is the case, i.e. if the first cryptographic information matches the second cryptographic information, the control access may be unlocked.

In general, the control access may provide control functionality to an entity communicating with the electronic control unit 10 (e.g. via the interface 12). For example, the control access may enable (i.e. authorize) the entity communicating with the electronic control unit 10 to read out status information and/or parameters of the electronic control unit 10, and/or to adapt parameters of the electronic control unit 10. In short, the control access may provide debug functionality (i.e. diagnostic functionality, or functionality for accessing or changing internal parameters or an internal status of the electronic control unit 10) to the external entity. Consequently, the processing circuitry 14 may be configured to obtain the second cryptographic information from an external apparatus via the interface 12, e.g. from an apparatus 20 as introduced in connection with FIG.

2a. The processing circuitry 14 may be configured to provide debug functionality for the electronic control unit 10 to the external apparatus 20 after unlocking the control access.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information. In some embodiments, the interface 12 may be a debug port of the electronic control unit, e.g. a JTAG port.

In embodiments the processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general purpose processor, a Digital Signal Processor (DSP), a micro-controller, etc.

More details and aspects of the electronic control unit 10 and of the corresponding method are mentioned in connection with the proposed concept or one or more examples described above or below (e.g. FIGS. 2a to 3). The electronic control unit 10 and corresponding apparatus may comprise one or more additional optional features corresponding to one or more aspects of the proposed concept or one or more examples described above or below.

Figure 2A:
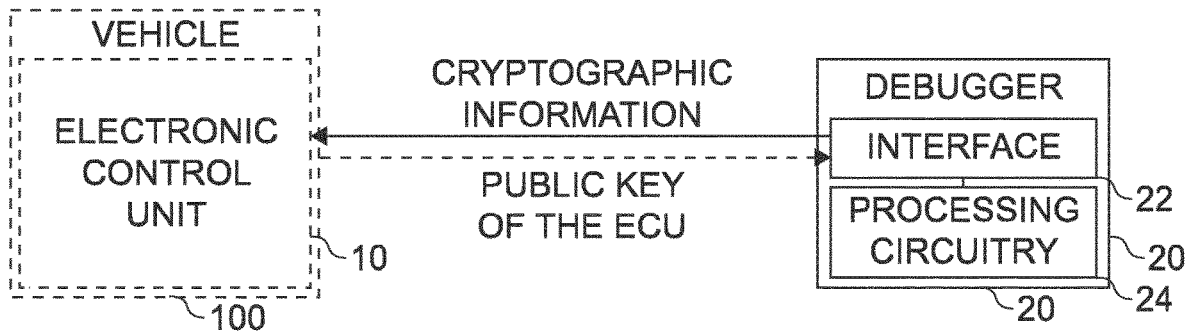
FIG. 2a shows a block diagram of an embodiment of an apparatus for performing control operations on an electronic control unit.

FIG. 2a shows a block diagram of an embodiment of an apparatus 20 for performing control operations on an electronic control unit 10, e.g. an electronic control unit of a vehicle 100 or of another device. The apparatus comprises processing circuitry 24 and an interface 22 that is coupled to the processing circuitry 24. In general, the processing circuitry 24 is configured to provide the functionality of the apparatus, e.g. in conjunction with the interface 12. The processing circuitry 24 is configured to provide (second) cryptographic information to the electronic control unit 10 via the interface 22. The cryptographic information is based on a public key of the electronic control unit and based on a private key of a second entity. The processing circuitry 24 is configured to gain control access to the electronic control unit 10 via the interface. The control access to the electronic control unit 10 is unlocked by the electronic control unit 10 based on the provided cryptographic information.

Figure 2B:
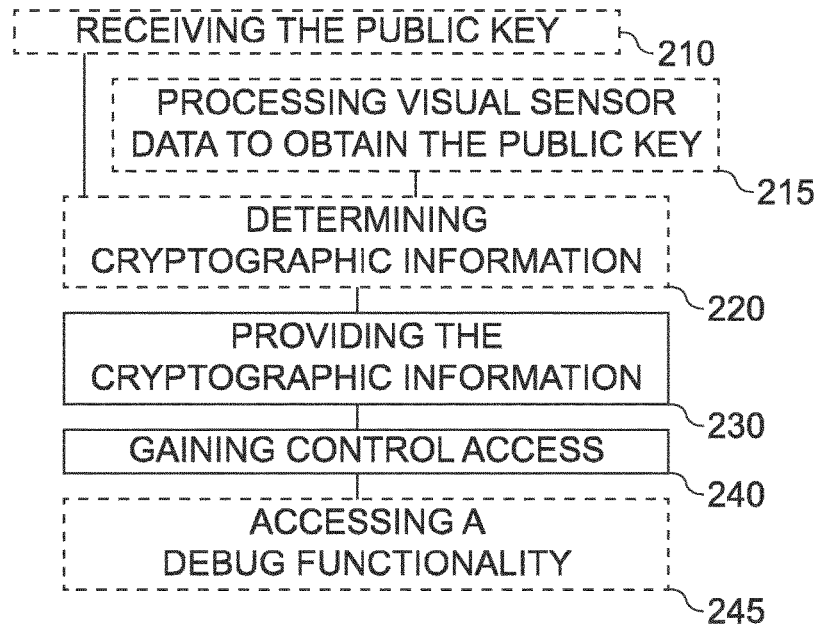
FIG. 2b shows a flow chart of an embodiment of a method for performing control operations on an electronic control unit.

FIG. 2b shows a flow chart of an embodiment of a corresponding method for performing control operations on an electronic control unit. The method comprises providing 230 cryptographic information to the electronic control unit via an interface. The cryptographic information is based on a public key of the electronic control unit and based on a private key of a second entity. The method comprises gaining 240 control access to the electronic control unit via the interface. The control access to the electronic control unit is unlocked by the electronic control unit based on the provided cryptographic information.

The following description relates both to the apparatus 20 of FIG. 2a and to the method of FIG. 2b. Features described in connection with the apparatus 20 of FIG. 2a may likewise be applied to the method of FIG. 2b.

Some embodiments of the present disclosure relate to an apparatus 20, a method and a computer program for performing control operations on an electronic control unit 10 of a vehicle 100. In other words, the apparatus 20 may be suitable for, or configured to, use a control access, i.e. a debugging access or a diagnostic access, to the electronic control unit. Accordingly, the processing circuitry 24 may be configured to access a debugging functionality (i.e. a diagnostic functionality) of the electronic control unit after gaining the control access to the electronic control unit. For example, the processing circuitry 24 may be configured to access and/or adapt one or more parameters and/or a status of the electronic control unit after gaining the control access to the electronic control unit. In terms of the language used in connection with FIGS. 1a and/or 1b, the apparatus 20 may be an apparatus of the second entity, gaining control access to the electronic control unit for (i.e. representing) the second entity.

The processing circuitry 24 is configured to provide cryptographic information to the electronic control unit via an interface 22, the cryptographic information being based on a public key of the electronic control unit and based on a private key of the second entity. As has been mentioned in connection with FIGS. 1a and/or 1b, the cryptographic information (denoted second cryptographic information in connection with FIGS. 1a and/or 1b) may be a shared secret, e.g. a symmetric cryptographic key, that is generated by the second entity using the private key of the second entity and the public key of the electronic control unit. In some embodiments, the processing circuitry 24 may use cryptographic information that is provided by another entity, e.g. by a server of the second entity. In other words, the processing circuitry 24 may be configured to retrieve the cryptographic information, e.g. from the server of the second entity, or from memory circuitry of the apparatus 20, if the cryptographic information is stored within a memory of the apparatus 20. Alternatively, the cryptographic information may be generated on-device, by the apparatus 20. In other words, the processing circuitry 24 may be configured to determine (i.e. generate) the cryptographic information based on the public key of the electronic control unit and based on the private key of the second entity.

In some embodiments, the public key of the electronic control unit may be retrieved from the server of the second entity. In other words, the processing circuitry 24 may be configured to obtain (i.e. receive) the public key of the electronic control unit from the server of the second entity. Alternatively, the public key of the electronic control unit may be obtained from the electronic control unit. For example, the public key of the electronic control unit may be printed on a label of the electronic control unit, or shown by a display of the electronic control unit. In this case, visual sensor data of a camera may be used to read the public key of the electronic control unit. In other words, the processing circuitry 24 may be configured to process visual sensor data (of a camera, e.g. a camera that is connected to the apparatus 20) depicting at least a part of the electronic control unit to obtain the public key of the electronic control unit. For example, the visual sensor data may comprise a photo of the electronic control unit, the photo depicting the public key. The processing circuitry 24 may be configured to extract the public key of the electronic control unit from the visual sensor data. Alternatively, the processing circuitry 24 may be configured to receive the public key from the electronic control unit via the interface 22. For example, the processing circuitry 24 may be configured to communicate with the electronic control unit via the interface 22 using a wired or wireless data communication connection, e.g. according to the JTAG standard. The processing circuitry 24 may be configured to receive the public key of the electronic control unit via the data communication connection, e.g. in response to a request from the apparatus 20.

The processing circuitry 24 is configured to gain control access to the electronic control unit via the interface 22. As has been laid out before, the control access to the electronic control unit may provide the apparatus 20 with access to the debugging I diagnostic functionality of the electronic control unit. Access to the debugging I diagnostic functionality may be locked before the cryptographic information is provided, and may be locked again after the apparatus 20 is disconnected from the electronic control unit. In other words, the control access to the electronic control unit is unlocked (i.e. made available) by the electronic control unit based on the provided cryptographic information, and may not be available to apparatuses incapable of providing the correct cryptographic information.

The interface 22 may correspond to one or more inputs and/or outputs for receiving and/or transmitting information, which may be in digital (bit) values according to a specified code, within a module, between modules or between modules of different entities. For example, the interface 22 may comprise interface circuitry configured to receive and/or transmit information.

In embodiments the processing circuitry 24 may be implemented using one or more processing units, one or more processing devices, any means for processing, such as a processor, a computer or a programmable hardware component being operable with accordingly adapted software. In other words, the described function of the processing circuitry 24 may as well be implemented in software, which is then executed on one or more programmable hardware components. Such hardware components may comprise a general purpose processor, a Digital Signal Processor (DSP), a micro-controller, etc.

Figure 3:
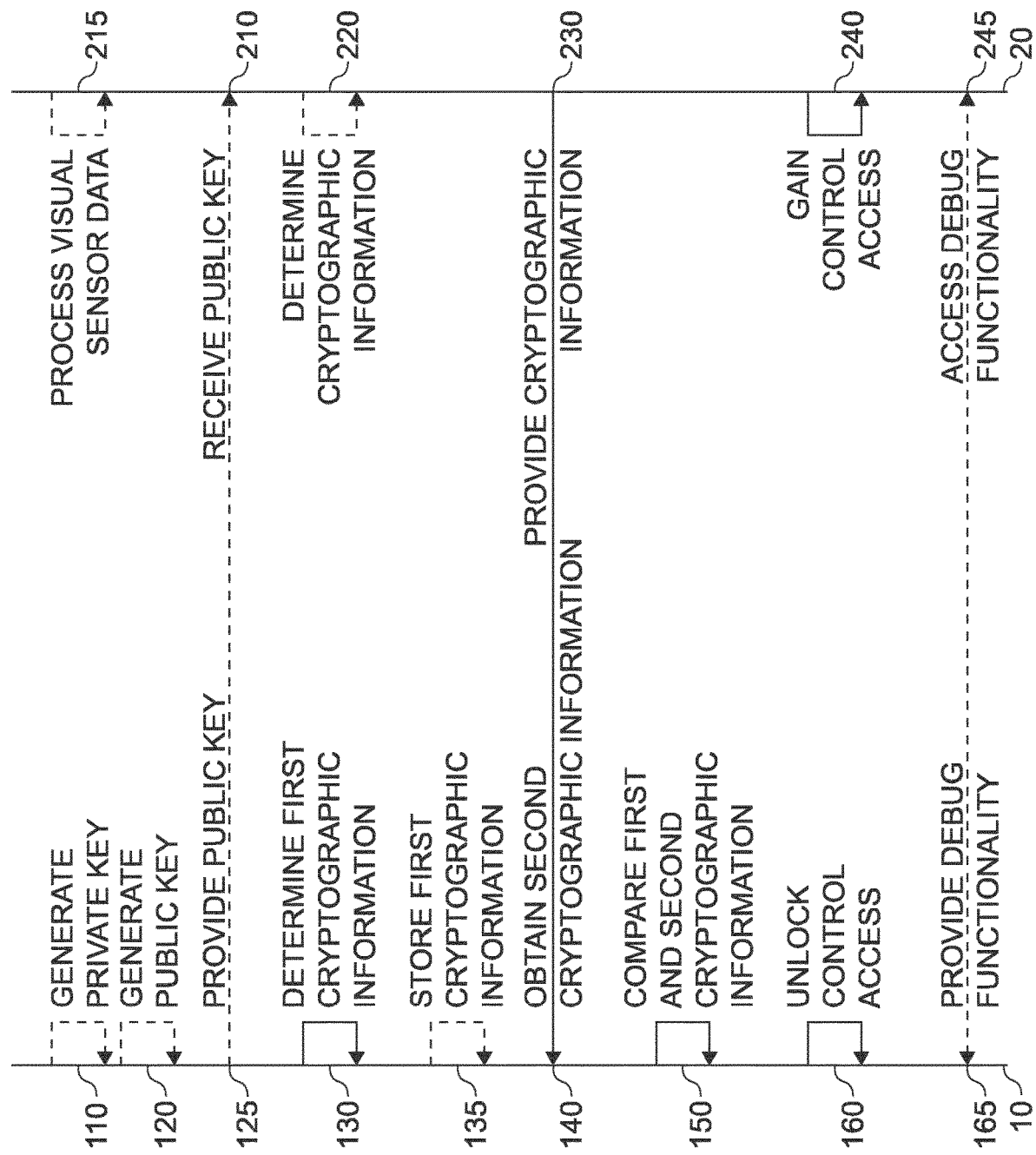
FIG. 3 shows a diagram of an information exchange performed between an electronic control unit and a debugging apparatus.

FIG. 3 shows a diagram of an information exchange performed between an electronic control unit and a debugging apparatus. FIG. 3 shows the interaction between the electronic control unit 10 of FIG. 1a and of the apparatus 20 of FIG. 2a. In FIG. 3, optional features are denoted with dashed lines. Embodiments of the present disclosure provide a system comprising the electronic control unit 10 (of FIG. 1a) and the apparatus 20 (of FIG. 2a).

In preparation of the comparison of the cryptographic information, both sides may optionally generate the cryptographic information, and/or the private and/or public keys that the cryptographic information is based on. For example, the electronic control unit 10 may generate 110 the private key of the electronic control unit 10, and/or the electronic control unit 10 may generate 120 the public key of the electronic control unit 10. Additionally, the public key of the electronic control unit 10 may be provided 125 (by the electronic control unit 10) and received 210 (by the apparatus 20). Alternatively, the apparatus 20 may process 215 visual sensor data to obtain the public key of the electronic control unit 10. Both sides determine (i.e. generate) 130/220 the respective cryptographic information (optional for the apparatus). Furthermore, the electronic control unit 10 may store 135 the first cryptographic information, and optionally discard its private key thereafter. The apparatus 20 provides 230 the (second) cryptographic information to the electronic control unit 10, which is obtained 140 (i.e. received) by the electronic control unit 10. The electronic control unit 10 compares 150 the first and second cryptographic information, and unlocks 160 control access if they match, so that the apparatus 20 gains 240 control access. Once the control access is unlocked, the electronic control unit 10 may provide debug functionality 165, which may be accessed 245 by the apparatus 20.

More details and aspects of the system are mentioned in connection with the proposed concept or one or more examples described above or below (e.g. FIG. 1a to 2b). The system may comprise one or more additional optional features corresponding to one or more aspects of the proposed concept or one or more examples described above or below.

Embodiments of the present disclosure provide an improved concept for securing the ownership and confidentiality of third-party generated secrets while avoiding their storage.

Embodiments may provide a concept for preventing the supplier from having any knowledge of the secret debug passwords and avoiding storing an entire database with secret keys. At least some embodiments are based on the Diffie-Hellman key exchange that is typically used for securely deriving a shared secret via an unprotected communication channel. In a Diffie-Hellman key exchange, both entities possess an asymmetric key pair with a public and a private key. Then both entities exchange their public key and combine it with their own private key, resulting in a shared secret. In the context of this disclosure, the first cryptographic information generated by the electronic control unit and the (second) cryptographic information provided/generated by the debugging apparatus correspond to the shared secret.

In embodiments, the OEM (i.e. the second entity) may generate a single asymmetric key pair (i.e. the private key and the public key of the second entity). Subsequently, e.g. when the supplier manufactures the embedded system, an individual asymmetric key pair may be generated on-chip (i.e. the private key and the public key of the electronic control unit). The controller may use the OEM public key and combine it with its (secret) private key to a device individual secret (i.e. the first cryptographic information). This secret may serve as the debug password. Optionally, the private key of the devices' asymmetric key pair may be deleted. If an entity (e.g. the debugging apparatus) requires debug access, the devices' public key may be made available, e.g. by means of the controller (for example the public key could be printed on the controller's package) or using a database. Contrary to a purely password based solution the database might only contains public keys, and may therefore be uncritical from a security point of view. In the final step, the OEM may generate the shared secret (i.e. the (second) cryptographic information) by combining the device's public key with its private key and send this key to the controller. If the two secrets match, the debug port may be unlocked. This approach can be therefore seen a time-shifted Diffie-Hellman key exchange. It may be seen as being time-shifted since the one part of the key exchange is performed when the debug port of the electronic control unit is locked and the other part is (only) conducted when requiring access to the device.

In an exemplary implementation of the concept, elliptic curve cryptography (ECC), and more specifically the elliptic curve Diffie-Hellman (ECDH) key exchange, has been used. Using ECDH, the process may be performed using one or more of the following actions:

Locking:
1. The backend stores an asymmetric ECC key pair serverpub, serverpriv (i.e. the public key and the private key of the second entity).
2. For each ECU, a secret random number ECUpriv (i.e. the private key of the ECU) is generated.

3. The ECU uses ECC to generate and store the public key ECUpub (i.e. the public key of the ECU)=ECUpriv×P where "×" denotes the scalar multiplication and P is the base point. Subsequently the ECUpriv key can be deleted from the ECU.
4. The ECU computes and stores the shared secret (i.e. the first cryptographic information): keyshared=serverpub×ECUpriv
5. The ECU locks the debug port.

Unlocking:
1. Obtain ECUpub of respective ECU either through the ECU itself (diagnostic job) or some other source (e.g. public key can be printed on package of controller).
2. Transfer the ECUpub to the backend and compute the shared secret (i.e. the (second) cryptographic information) keyshared=ECUpub×serverpriv.
3. Obtain keyshared and transfer key to component that checks for equivalence.
4. If received and stored key are equivalent debug port is unlocked.

This may enable that the supplier does not possess the debug password, and avoid the necessity to store and manage an entire database with secret keys. The concept may be used for electronic control unit in automotive and embedded systems environments.

In some other systems, a more direct approach may be taken, in which it may at least be avoided that the supplier is capable of illegally storing the generated password when processing them. This problem can be tackled by generating the password on the device, locking the debug port and storing the password in some application on the controller. The application unlocks the debug port by providing the password, e.g. only if it receives a valid certificate. The corresponding key pair may be generated by the OEM where the public key is stored into the component and the private key is controlled by the OEM. A valid certificate might be issued only if an authorized person requests it. While this approach overcomes some of the initial issues, it assumes that the processor is operating in a functional state. Often it is the case that a controller is debugged when faulty behavior was observed. As such it is common that the processor is incapable to boot and hence incapable of verifying the incoming certificate. Furthermore, the hardware debug functionality is protected through passwords (i.e. symmetric keys) that are processed by the supplier when storing them in a database. Thus, the key exchange provided by embodiments of the present disclosure may provide a more comprehensive approach, which may also be applied if the main processor of the electronic control unit is stuck.

More details and aspects of the concept are mentioned in connection with the proposed concept or one or more examples described above or below (e.g. FIG. 1a to 3). The concept may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purpose to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An electronic control unit for a vehicle, the electronic control unit comprising processing circuitry configured to:
   determine first cryptographic information based on a private key of the electronic control unit and based on a public key of a second entity;
   obtain second cryptographic information via an interface;
   compare the first cryptographic information and the second cryptographic information; and
   unlock a control access to the electronic control unit if the second cryptographic information is based on a private key of the second entity and based on a public key of the electronic control unit.

2. The electronic control unit according to claim 1, wherein the processing circuitry is configured to store the first cryptographic information using memory circuitry of the electronic control unit, and to discard the private key of the electronic control unit after determining the first cryptographic information.

3. The electronic control unit according to claim 2, wherein the processing circuitry is configured to determine the first cryptographic information during a factory setup process of the electronic control unit.

4. The electronic control unit according to claim 3, wherein the processing circuitry is configured to generate the private key of the electronic control unit.

5. The electronic control unit according to claim 2, wherein the processing circuitry is configured to obtain the second cryptographic information from an external apparatus via the interface, and to provide debug functionality for the electronic control unit to the external apparatus after unlocking the control access.

6. The electronic control unit according to claim 1, wherein the processing circuitry is configured to determine the first cryptographic information during a factory setup process of the electronic control unit.

7. The electronic control unit according to claim 1, wherein the processing circuitry is configured to generate the private key of the electronic control unit.

8. The electronic control unit according to claim 1, wherein the processing circuitry is configured to generate the public key of the electronic control unit based on the private key of the electronic control unit, and to provide the public key of the electronic control unit via the interface.

9. The electronic control unit according to claim 8, wherein the public key of the electronic control unit is provided via the interface during a factory setup process of the electronic control unit.

10. The electronic control unit according to claim 1, wherein the public key of the electronic control unit is shown in machine-readable form on the electronic control unit.

11. The electronic control unit according to claim 1, wherein the processing circuitry is configured to obtain the second cryptographic information from an external apparatus via the interface, and to provide debug functionality for the electronic control unit to the external apparatus after unlocking the control access.

12. The electronic control unit according to claim 11, wherein the processing circuitry is configured to provide the debug functionality by providing access for adapting one or more parameters via the interface.

13. An apparatus for performing control operations on an electronic control unit of a vehicle, the apparatus comprising processing circuitry configured to:
    provide cryptographic information to the electronic control unit via an interface, the cryptographic information being based on a public key of the electronic control unit and based on a private key of a second entity; and
    gain control access to the electronic control unit via the interface, wherein the control access to the electronic control unit is unlocked by the electronic control unit based on the provided cryptographic information.

14. The apparatus according to claim 13 wherein the processing circuitry is configured to determine the cryptographic information based on the public key of the electronic control unit and based on the private key of the second entity.

15. The apparatus according to claim 14, wherein the processing circuitry is configured to communicate with the electronic control unit via the interface using a wired or wireless data communication connection, wherein the processing circuitry is configured to receive the public key of the electronic control unit via the data communication connection.

16. The apparatus according to claim 14, wherein the processing circuitry is configured to process visual sensor data depicting at least a part of the electronic control unit to obtain the public key of the electronic control unit.

17. The apparatus according to claim 13, wherein the processing circuitry is configured to access a debugging functionality of the electronic control unit after gaining the control access to the electronic control unit.

18. A method for an electronic control unit of a vehicle, the method comprising:
    determining first cryptographic information based on a private key of the electronic control unit and based on a public key of a second entity;
    obtaining second cryptographic information via an interface;
    comparing the first cryptographic information and the second cryptographic information; and
    unlocking a control access to the electronic control unit if the second cryptographic information is based on a private key of the second entity and based on a public key of the electronic control unit.

19. A method for performing control operations on an electronic control unit of a vehicle, the method comprising:
    providing cryptographic information to the electronic control unit via an interface, the cryptographic information being based on a public key of the electronic control unit and based on a private key of a second entity; and gaining control access to the electronic control unit via the interface, wherein the control access to the electronic control unit is unlocked by the electronic control unit based on the provided cryptographic information.

\* \* \* \* \*